May 7, 1929.  A. S. HAWKS  1,711,530
INTERNAL COMBUSTION ENGINE INSTALLATION
Filed Sept. 27, 1926
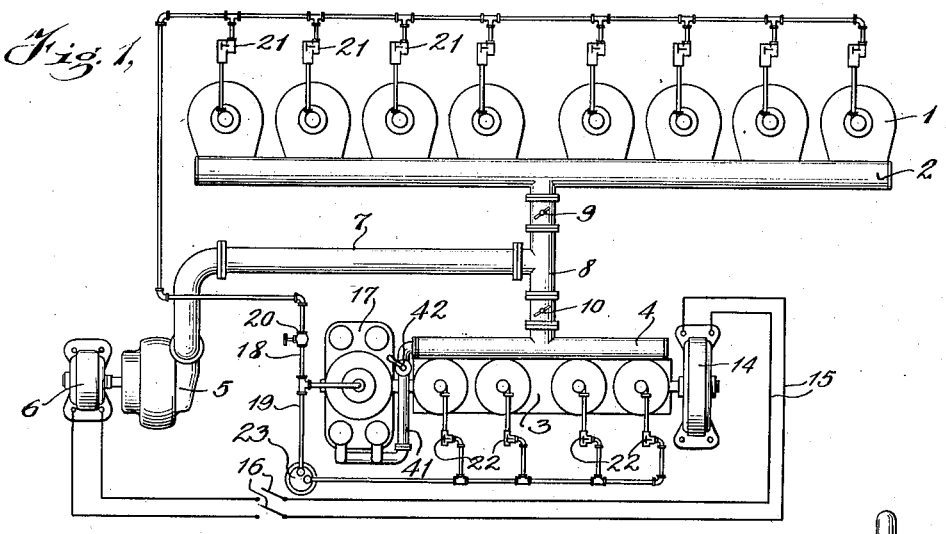
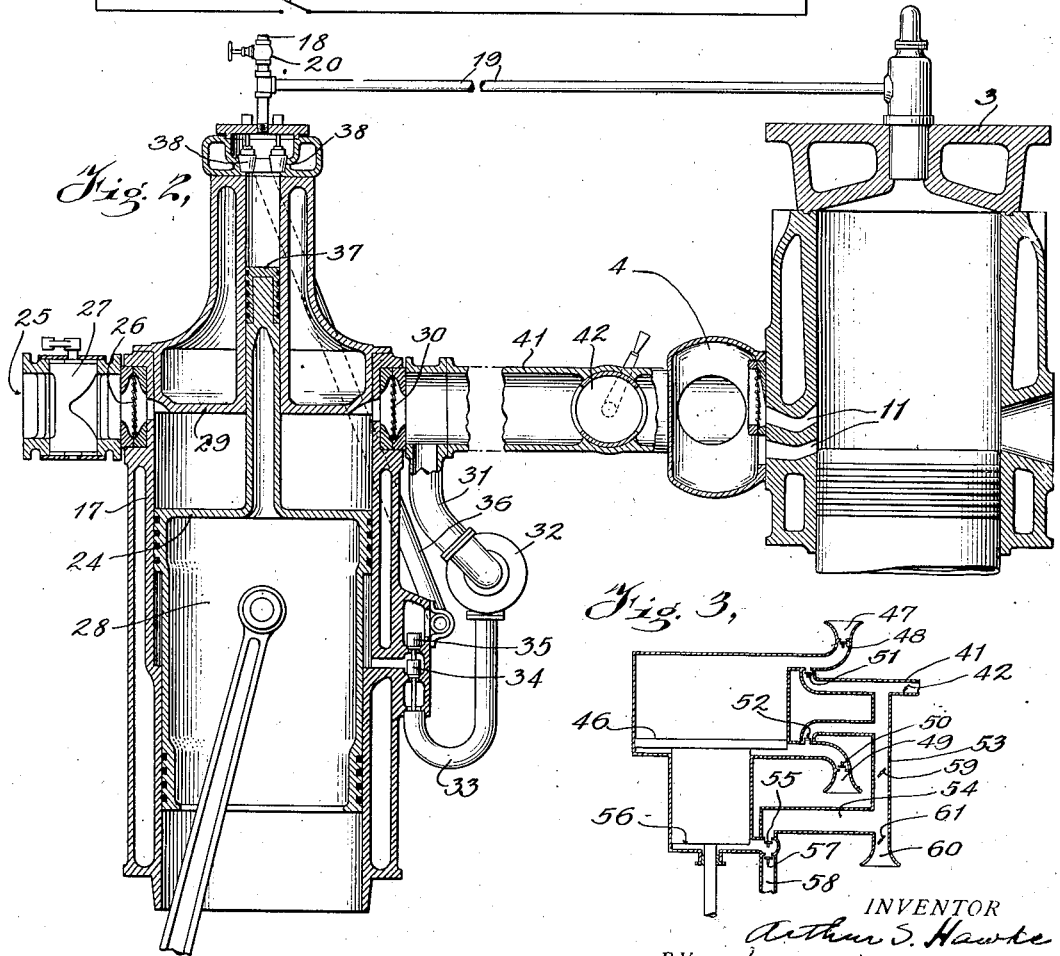
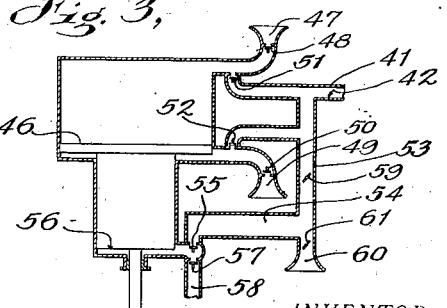
INVENTOR
Arthur S. Hawks
BY
ATTORNEYS.

Patented May 7, 1929.

1,711,530

UNITED STATES PATENT OFFICE.

ARTHUR S. HAWKS, OF ST. LOUIS, MISSOURI, ASSIGNOR TO BUSCH-SULZER BROS.-DIESEL ENGINE COMPANY, OF ST. LOUIS, MISSOURI, A CORPORATION OF MISSOURI.

INTERNAL-COMBUSTION-ENGINE INSTALLATION.

Application filed September 27, 1926. Serial No. 137,909.

In some large power or prime mover installations involving a number of internal combustion engines of the kind requiring the operation of air pumps, notably some installations of large Diesel engines, it has been the practice to drive the air pumps for the entire group from one engine only. This is frequently the practice in marine installations, that is to say, on shipboard, where a main engine is devoted to propelling the ship and an auxiliary engine (so called) is provided to supply miscellaneous power requirements about the ship; commonly the pump for compressing the injection air for both engines, and also a low-pressure scavenging air blower for the auxiliary engine, are direct-connected to the auxiliary engine while a turbo blower for supplying the low-pressure scavenging air for the main engine, is driven by an electric motor receiving its energy from an electric generator driven by the auxiliary engine and also furnishing the current for the ship's lights, the current for the electric motors operating the derricks, etc. In port, when the main engine is at rest, the turbo blower is disconnected from the generator so that it is left at rest also.

The object of the invention is to improve internal combustion engine installations having air pumps, and especially installations of this general character, and it is directed to the more efficient use of the air pumps, both high and low pressure. By more efficiently using the air pumping apparatus, my invention eliminates the scavenging air blower of such installations as above described, for example. In such installations the electric generator and a high pressure air pump of sufficient capacity to supply the fuel-injecting air for both engines, may both be direct-connected to the auxiliary engine as before, but the electrically-driven low pressure pump for supplying the scavenging and combustion air is enlarged to sufficient capacity to supply both engines, and arrangement is made whereby the scavenging and combustion air for the auxiliary engine can be taken from the high compression air pump when the main engine is at rest and the turbo blower is shut down.

Two such forms of the invention are illustrated in the accompanying drawing.

Fig. 1 is a diagrammatic plan view or layout of a complete installation of one form of the invention. Fig. 2 is a diagrammatic representation, in section, of the high compression air pump, the scavenging air receiver for the auxiliary engine, and a single cylinder of the auxiliary engine of Fig. 1, together with the connections between the same. Fig. 3 is a diagrammatic section of another injection air pump and the connections leading therefrom illustrating the second form of the invention.

In Fig. 1 the main or propelling engine is indicated by the engine cylinders at 1 and their scavenging air receiver at 2; the auxiliary engine is indicated at 3 and its scavenging air receiver at 4 opening to the scavenging and re-charging air ports 11. These engines may be assumed to be two cycle Diesel engines in which the fuel is injected by high pressure air. A turbo blower for the low pressure scavenging and combustion air for both engines is shown at 5, and 6 is the electric motor for driving it; the outlet 7 from the blower leads to the T-connection 8 going to both the scavenging air receivers 2 and 4. The two branches of the T-connection are provided with intermediate regulating valves 9 and 10, and valve 10 is also adapted to entirely shut off its passage to prevent the escape of air from the receiver 4 by backward flow through the blower when the blower is stopped and scavenging air for the auxiliary engine is supplied by the high compression or injection air pump as later described. An appropriate electric generator 14 is direct connected to the auxiliary engine 3 and may be assumed to furnish the power for the ship lights, derricks, etc., as well as power for the blower motor 6; 15 indicates the conductors connecting the generator to the motor 6, and 16 is a switch for disconnecting the motor 6 from the generator 14 to stop the blower when the ship is in port and the main engine 1 is at rest. The high compression air compressor 17 is also direct connected to the auxiliary engine 3 and its capacity is sufficient to furnish the air for injecting the fuel for both engines; the outlet from its high compression stage leads by pipes 18 and 19 respectively, to the fuel injection valves of the main engine 1 and auxiliary engine 3, the line 18 to the main engine being provided with a shut-off valve 20 to shut off this line when the main engine is at rest, and both lines are provided with individual check valves 21 and 22 interposed in advance of the injection valves of the main and auxiliary engines 1 and 3 respectively. The customary high pressure or injection air tank may be interposed in the line 19, as indicated at 23.

The high compression air pump 17 illustrated is a three-stage pump as will be apparent from Fig. 2. Its air inlet is at 25, the intake valve at 26, and a rotary sleeve-valve for regulating the air inflow and delivery is shown at 27 in the pump intake. Air is drawn in through the valve 26 on the downward or suction stroke of the compressor piston 28, and on its upward stroke is compressed between the annular head 24 of the piston and the cylinder head 29 and thence driven through the outlet valve 30. Like the inlet valve 26, the valve 30 may consist of a set of pivoted louvers. All this air passing the valve 30 may flow through the connection 31 to the air cooler 32 and thence through connection 33 to the inlet valve 34 of the second stage of the pump. The second stage is underneath the edge of the annular head 24 of the piston 28, and the partially compressed air entering through valve 34 underneath the edge of the annular head 24 on the upward stroke of the piston, is further compressed on the downward stroke and driven around the outlet valve 35 to the connection 36 leading to the intake valve and intake port (not shown) of the third or high compression stage of the pump which is above the small circular head 37 of the piston. It will be understood that the inlet or outlet valves 34 and 35 of the second or intermediate stage of the pump operate independently of each other in the usual manner of inlet and outlet valves of pumps. In the high pressure stage the air is finally compressed to the injection pressure and is driven through the outlet valves 38 to the connections 18 and 19, the storage bottle 23 and the injection valves of the two engines.

In such and analogous multistage high pressure pumps, the air for scavenging the auxiliary engine and recharging its cylinders with combustion air when this engine alone is working, may be taken from one of the low pressure stages if desired. For this purpose the connection 41 is inserted. This connection leads from the first-stage outlet valve 30 of the high pressure pump 17 to the scavenging air receiver 4 of the auxiliary engine and contains a shut-off valve 42 which is illustrated as a manually operated rotary sleeve-valve.

This shut-off valve 42 is closed when both engines are in operation, valve 20 in the high pressure line 18 is open, and the switch 16 is closed. Accordingly all the air from the first stage of the high pressure pump passes to the second and third stages and thence to the lines 18 and 19 and the injection valves of the two engines. Since the switch 16 is closed, the turbo blower 5 is in operation and supplies the scavenging and combustion air for both engines, the flow to the two engines being proportioned and regulated as needed by the valves 9 and 10. When the main engine is stopped, however, and only the auxiliary engine is to be operated, as in port, the valve 20 is closed to exclude injection air from the main engine, the switch 16 is opened to stop the turbo blower 5, the valve 42 is opened more or less to admit a regulated part of the first-stage air of the high pressure pump 17 to the receiver 4 for scavenging and recharging purposes, and valve 10 is closed to prevent the escape of this air by backward flow through the turbo blower. A part of the (now excess) capacity of the high pressure pump 17 is thus employed to scavenge and recharge the auxiliary engine, such part of the first stage air as does not pass to the receiver 4 passing instead to the second and third stage of the high pressure pump as before and issuing to the line 19 for injecting the fuel into the cylinders of the auxiliary engine. By enlarging the capacity of the turbo blower 5 sufficient for it to serve both engines, and utilizing the high pressure pump 17 to provide scavenging and combustion air when only the auxiliary engine is working, I have dispensed with the heretofore-used scavenging air pump for the auxiliary engine alone, as is now apparent.

Fig. 3 illustrates a variant from the foregoing in that when the main engine is at rest, the whole of the air from the first stage of the high pressure pump is devoted to scavenging and recharging the auxiliary engine, the number of stages in the pump being reduced by one so far as the injection air for the auxiliary engine is concerned. In the pump very diagrammatically illustrated in Fig. 3, the piston 46 is double acting and the compression at both sides of this piston is first stage compression when the main engine 1 is operated. The inlet to the top of the piston 46 is indicated at 47 and the corresponding inlet valve at 48. The inlet for the under side of the same piston is represented at 49 and its inlet valve is at 50. The two outlet valves are indicated at 51 and 52 respectively. The two outlet passages from these valves unite into a single passage 53 leading by way of passage 54 to the inlet valve 55 of the second stage constituted by the trunk piston 56. The outlet valve 57 and passage 58 of this second stage can be regarded as leading to the fuel injection valves of the two engines for example (or pipes like 18 and 19), or to a third stage of compression (not shown) and thence to the injection valves. Pipe 41 (corresponding to pipe 41 in Figs. 1 and 2, and leading to the scavenging air receiver of the auxiliary engine) leads off from the joint passage 53 and contains a valve 42 for the same purpose as the valve 42 of the preceding figures. Intermediate the passage 41 and the passage 54 however, a valve 59 is inserted in the passage 53, and also an air inlet 60 is provided, together with a shut-off valve 61, which, when opened, permits air to flow into the valve 55 of the (normally second stage) compression space underneath the piston 56 as will be apparent from the drawing. Except for these differences in the construction of the high pressure pump, Fig. 1 may be assumed to illustrate the power plant; this high pressure pump may be assumed to be driven by the auxiliary engine 3 and a turbo blower 5 may be assumed to supply low pressure air when both engines are working.

When both the main and auxiliary engines are in operation with the multistage compressor of Fig. 3, the valve 42 is closed, and the compressor valve 59 is open and the compressor valve 61 is closed; by assumption, scavenging and combustion air for both is taken from a motor-driven turbo blower such as 5 in Fig. 1. Air enters the multistage high pressure compressor of Fig. 3 through both of the inlet ports 47 and 49, and the air thus compressed at the two sides of the piston 46 passes through the passages 53 and 54 to the second stage of the compressor underneath the piston 56, and then further compressed to the outlet pipe 58 and ultimately to the injection valves of both engines. When the main engine is stopped however, and the normal source of scavenging air for the auxiliary engine 3 is shut-off (by opening the switch 16 for example, and if necessary closing valve 10, Fig. 1), the compressor valves 42 and 61 are opened and the compressor valve 59 is closed. All the air entering the pump through the inlets 47 and 49, that is to say, all the first stage compression air, now flows through the passage 41 to and forms the scavenging and combustion air of the auxiliary engine 3. The air for the (normally) second stage of the pump, that is to say, underneath the piston head 56, is now taken in through the inlet 60. This air is delivered through the passage 58 as before however, and ultimately to the injection valves of the auxiliary engine. The capacity of the multistage pump has been reduced of course by the elimination of the (normally) first or low pressure stage which is now used as the scavenging and combustion air pump for the auxiliary engine; this stage can be omitted however inasmuch as at this time the high compression pump is called on to furnish injection air for the auxiliary engine only. The scavenging and combustion air is regulated by the valve 42, and the injection air is regulated by the valve 61.

It will be understood that while I have thus illustrated and described two embodiments of my invention, my invention is not limited thereto except as it appears in the accompanying claims.

Claims:

1. In a power installation, the combination of two internal combustion engines, a pump arranged to supply combustion air to both engines, means for driving said pump, said means permitting the pump to be stopped when one of the engines is stopped, and means for supplying combustion air to the other engine when the pump is stopped.

2. In a power installation, the combination of two internal combustion engines, a pump having sufficient capacity and arranged to supply combustion air to both said engines, means for completing and interrupting at will a driving connection between said pump and one of the engines, and means for supplying combustion air to said engine when the pump is stopped.

3. In a power installation, the combination of two internal combustion engines, a pump having sufficient capacity and arranged to supply combustion air to both said engines, means for completing a driving connection between said pump and one of the engines, said means being adapted to stop the pump when the other engine is stopped, and means for supplying combustion air to the first mentioned of the two engines when the pump is stopped.

4. In an internal combustion engine installation, the combination of the engine, a combustion air pump therefor, an injection air pump, a connection from the injection air pump through which the injection air pump can cause combustion air to be supplied the engine, and means for closing and opening said connection.

5. In a power installation, the combination of two internal combustion engines, means for supplying combustion air to both engines, an injection air pump driven by one of said engines, said air pump having sufficient capacity and being arranged to supply injection air to both engines, a connection from the injection air pump through which the injection air pump can cause combustion air to be supplied the engine driving it, and means for closing and opening said connection.

6. In a power installation, the combination of two internal combustion engines, a combustion air pump having sufficient capacity and arranged to supply combustion air to both said engines, said pump being arranged to be stopped when one of the engines is stopped, an injection air pump driven by the other of said engines and having sufficient capacity and being arranged to supply injection air to both the engines, a connection through which the injection air pump can supply the combustion air of the engine driving it, and means for closing and opening said connection.

7. In a power installation, the combination of two internal combustion engines, an injection air pump driven by one of said engines and having sufficient capacity and being arranged to supply injection air to both said engines, an electric generator also driven by the same engine, a scavenging air pump having sufficient capacity and arranged to supply scavenging air to both said engines, an electric motor to drive the scavenging air pump, electrical connections, including a switch, between said motor and said generator through which the generator can drive the motor, a connection from the injection air pump to the scavenging air receiver of the engine driving the pumps through which the injection air pump can supply the combustion air of said engine, means for closing and opening said connection, and means for closing and opening the connection between said receiver and the scavenging air pump.

8. In a power installation, the combination of two internal combustion engines, means for supplying scavenging air to both the engines, a multistage injection air pump having sufficient capacity and arranged to supply injection air to both said engines, a connection from a lower pressure stage of said pump to the scavenging air receiver of one of said engines through which said pump can supply the scavenging air of one of said engines, and means for closing and opening said connection.

9. In a power installation, the combination of an internal combustion engine, means for supplying combustion air to said engine, a multistage injection air pump, a connection from a lower pressure stage of said pump to the air-recharging port of the engine through which said pump can supply the combustion air of the engine, and means for closing and opening said connection.

10. In a power installation, the combination of an internal combustion engine, a multistage injection air pump to supply fuel injecting air, and a connection from a lower pressure stage of said pump to the air-recharging port of the engine through which said pump can supply the low-pressure combustion air of the engine.

In testimony whereof, I have signed this specification.

ARTHUR S. HAWKS.